J. J. GRAHAM.
PROTECTOR FOR HARVESTERS.
APPLICATION FILED DEC. 15, 1909.
968,935.
Patented Aug. 30, 1910.
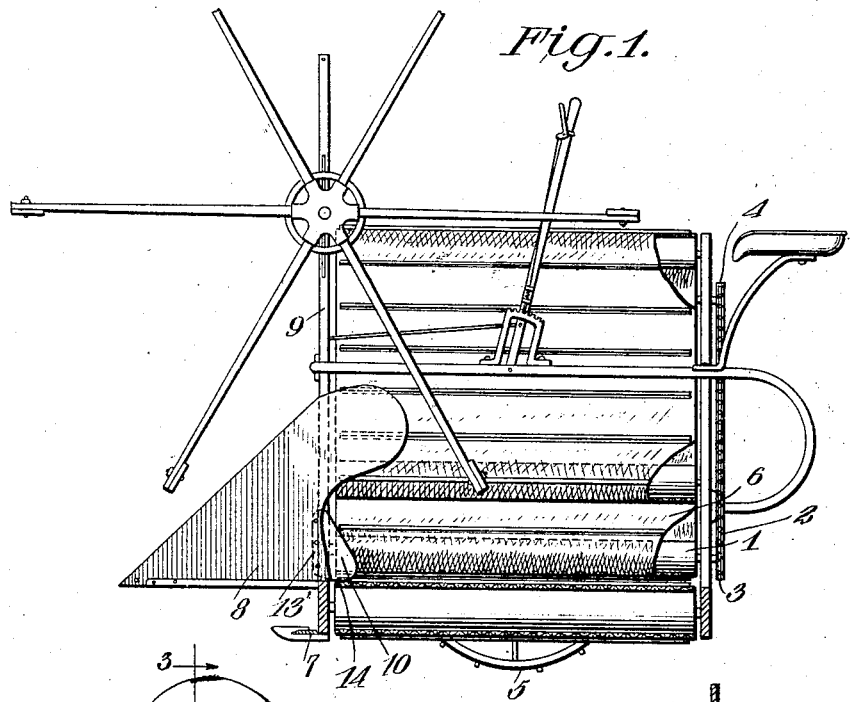
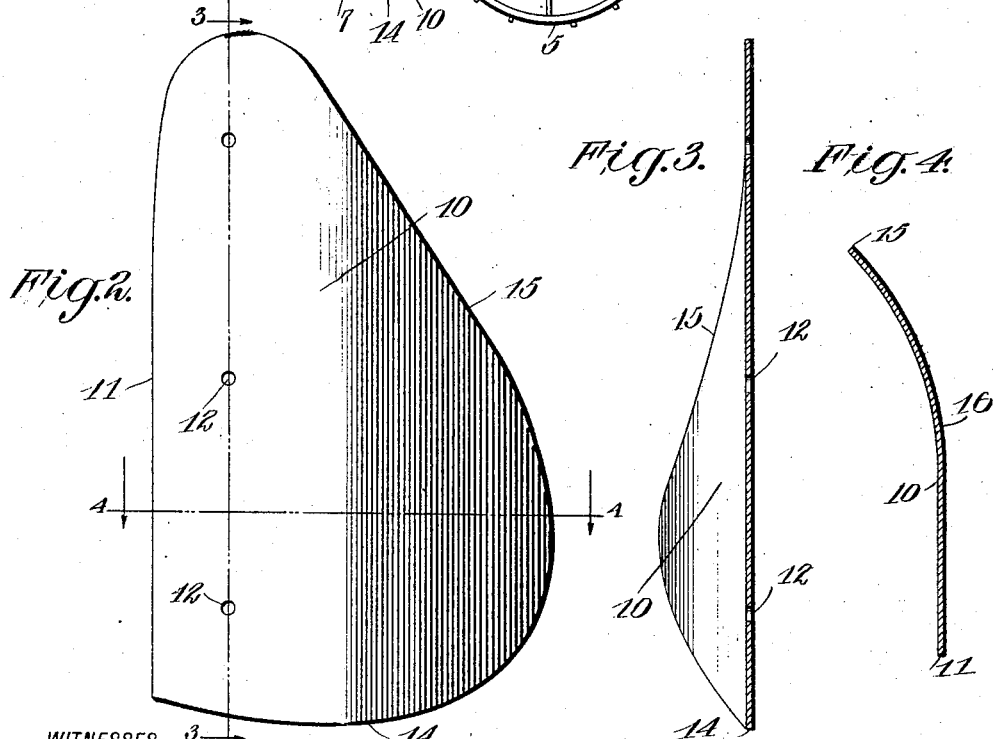
WITNESSES
Samuel E. Wade.
C. E. Trainor
INVENTOR
JOHN J. GRAHAM
BY Munn & Co.
ATTORNEYS

UNITED STATES PATENT OFFICE.

JOHN J. GRAHAM, OF SHEYENNE, NORTH DAKOTA.

PROTECTOR FOR HARVESTERS.

968,935.  Specification of Letters Patent.  Patented Aug. 30, 1910.

Application filed December 15, 1909. Serial No. 533,139.

*To all whom it may concern:*

Be it known that I, JOHN J. GRAHAM, a citizen of the United States, and a resident of Sheyenne, in the county of Eddy and State of North Dakota, have invented certain new and useful Improvements in Protectors for Harvesters, of which the following is a specification.

My invention is an improvement in protectors for harvesters, and consists in certain novel constructions, and combinations of parts, hereinafter described and claimed.

The object of this invention is to provide a protector of the character specified, which will prevent straws, gum, etc., from collecting on and clogging the rollers, especially the lower roller of the elevator apron.

Referring to the drawings forming a part hereof:—Figure 1 is a side view of a harvester provided with the improvement. Fig. 2 is a face view of the improvement detached. Fig. 3 is a section on the line 3—3 of Fig. 2, and Fig. 4 is a section on the line 4—4 of the same figure.

As is well known, there is a great tendency toward clogging of the harvester by straw, etc., materially increasing the draft, slowing the operation, and finally stopping the machine.

The principal point where the clogging takes place is at the lower roller of the lower elevating canvas, at the inner end of the sickle bar and just behind the same. This roller 1 is geared to the driving mechanism of the machine by a chain 2, passing over a sprocket wheel 3 on the roller, and connecting it with another sprocket wheel 4, which is driven indirectly from the main wheel 5.

A canvas apron 6 passes over the roller and the cut straws are elevated between one run of this apron and the adjacent run of another in the usual manner. The said roller is directly behind the sickle bar 7, and the usual dividing board 8 is secured to the frame 9 of the machine at the end of the sickle bar.

The protector 10, shown more particularly in Figs. 2, 3 and 4, is secured to the rear end of the inner dividing board, as shown in Fig. 1. The said protector is formed from a sheet of suitable rigid and strong material, and is an irregular right-angled triangle in shape.

The front edge 11 of the protector is substantially straight, and the sheet is provided with a series of openings 12 parallel with the edge 11, and the sheet is secured to the inner dividing board by means of bolts or nuts 13, which pass through the openings 12 and the dividing board.

The protector is arranged (Fig. 1) in a slightly inclined position with the base 14 at an angle to the axis of the roller, and with the front edge of the sheet inclining forwardly toward its top, and with the corner formed by the junction of the base 14 and the hypothenuse 15 extending back of the front edge of the apron. The sheet is also curved transversely, as indicated at 16 in Fig. 4, and the convex side of the sheet is arranged toward the apron, the cut straws being thus directed outwardly away from the edge of the apron. It will be evident that the straws will be effectually prevented from being caught between the apron and the roller, thus preventing clogging of the same.

The operation will be evident from the description, as will also the simplicity and inexpensiveness of the protector, and its efficiency.

It may be applied to any harvester, with no change except the boring of a few holes.

I claim:—

1. In a harvester, the combination with the inner dividing board, the elevator apron and the supporting roller therefor, of a protector comprising a substantially triangular sheet of rigid material secured to the inner dividing board and arranged with one of its sides substantially parallel with the axis of the roller which supports the under elevator apron, said sheet having one of its angles extending over the under elevator apron at the point where it passes over the lower supporting roller, the said sheet being curved on its horizontal axis and having the convex side of the sheet toward the apron.

2. In a harvester, the combination with the inner dividing board, the under elevator apron and the supporting roller therefor, of a protector comprising a substantially triangular sheet of rigid material secured to the inner dividing board and arranged with one of its sides substantially parallel with the axis of the roller, said sheet having one of its angles extending over the under elevator apron at the point where it passes over the lower supporting roller.

JOHN J. GRAHAM.

Witnesses:
S. G. SEVERTSON,
OSCAR T. O. SEDAHL.